United States Patent
Pengg et al.

(10) Patent No.: US 9,328,800 B2
(45) Date of Patent: May 3, 2016

(54) CHAIN JOINT FOR LINK CHAINS

(71) Applicant: pewag austria GmbH, Graz (AT)

(72) Inventors: Aegyd Pengg, Klagenfurt (AT); Franz Fuchs, Kapfenberg (AT)

(73) Assignee: Pewag Austria Gmbh, Graz (AT)

(*) Notice: Subject to any disclaimer, the term of this patent is extended or adjusted under 35 U.S.C. 154(b) by 0 days.

(21) Appl. No.: 14/650,507

(22) PCT Filed: Dec. 19, 2012

(86) PCT No.: PCT/EP2012/076235
§ 371 (c)(1),
(2) Date: Jun. 8, 2015

(87) PCT Pub. No.: WO2014/094848
PCT Pub. Date: Jun. 26, 2014

(65) Prior Publication Data
US 2015/0316126 A1 Nov. 5, 2015

(51) Int. Cl.
| F16G 15/04 | (2006.01) |
| F16G 13/12 | (2006.01) |
| F16G 15/02 | (2006.01) |
| F16G 15/06 | (2006.01) |

(52) U.S. Cl.
CPC .............. *F16G 15/04* (2013.01); *F16G 13/12* (2013.01); *F16G 15/02* (2013.01); *F16G 15/06* (2013.01)

(58) Field of Classification Search
CPC .......... F16G 13/12; F16G 15/02; F16G 15/04; F16G 15/06
USPC ............................................................ 59/86
See application file for complete search history.

(56) References Cited

U.S. PATENT DOCUMENTS

| 1,195,019 | A | * | 8/1916 | Huber | ................. F16G 15/06 59/86 |
| 3,707,072 | A | * | 12/1972 | Elasasser | ............... F16G 15/02 59/35.1 |
| 4,977,649 | A | | 12/1990 | Smetz | |
| 5,077,966 | A | * | 1/1992 | Braun | ................. F16G 13/12 59/86 |
| 7,900,430 | B1 | * | 3/2011 | McCauley | ............. F16G 15/04 59/85 |
| 2013/0333348 | A1 | | 12/2013 | Pengg et al. | |

FOREIGN PATENT DOCUMENTS

| CA | 909 010 A | 9/1972 |
| DE | 77 12 924 U1 | 10/1978 |
| DE | 20 2006 010 572 U1 | 10/2006 |
| EP | 0 183 641 A2 | 6/1986 |
| EP | 302 818 A2 | 2/1989 |
| JP | S51 145456 U | 11/1976 |
| WO | 2012/119613 | * 9/2012 |
| WO | WO 2012/119613 A1 | 9/2012 |

* cited by examiner

*Primary Examiner* — David B Jones
(74) *Attorney, Agent, or Firm* — Christensen Fonder P.A.

(57) ABSTRACT

A chain joint for link chains, having a main body in the form of an oval chain link with two mutually parallel longitudinal legs which are connected to one another at their ends via a rounded link portion, one defining a receiving opening for receiving chain links. The receiving opening is bounded at its ends by one longitudinal leg section, wherein, in the longitudinal leg, a threaded bore runs in the longitudinal direction and extends in both longitudinal leg sections. A closure screw engages the threaded bore in both longitudinal leg sections, so that, while maintaining the predefined sizes for outer circumference and link width of the main body, the main body, in the region of its longitudinal legs, includes a profile cross section that is larger than the profile cross section in the region of its rounded link portions.

8 Claims, 1 Drawing Sheet

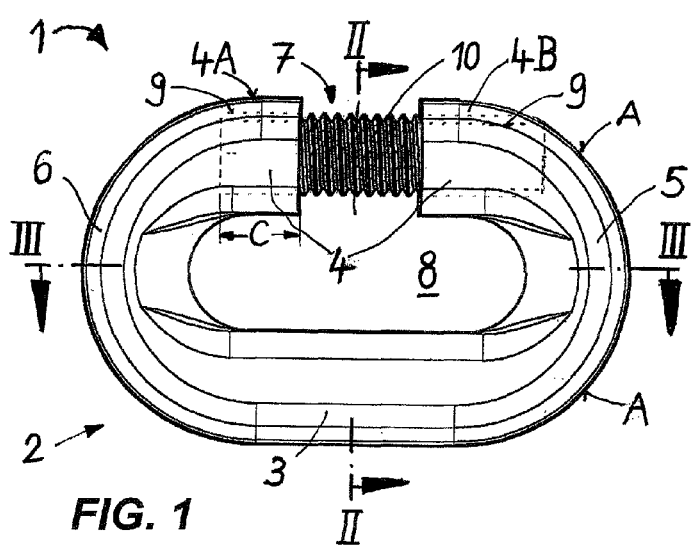
FIG. 1
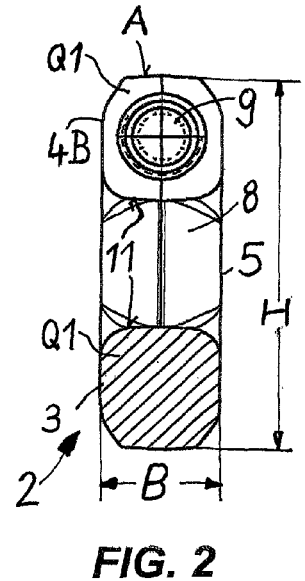
FIG. 2
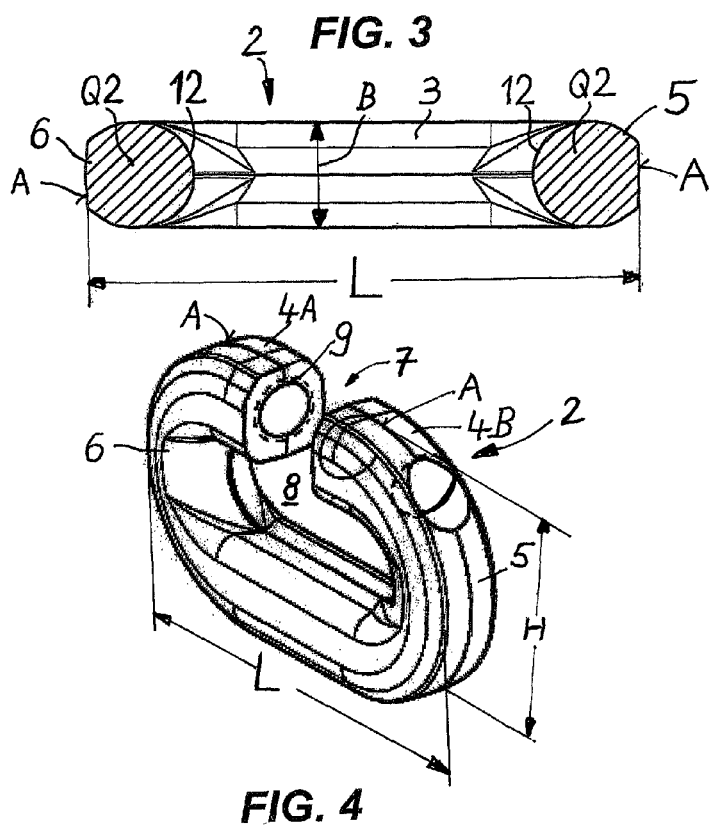
FIG. 3
FIG. 4
FIG. 5

CHAIN JOINT FOR LINK CHAINS

RELATED APPLICATIONS

The present application is a U.S. National Phase entry of PCT Application No. PCT/EP2012/076235, filed Dec. 19, 2012, the disclosure of which is hereby incorporated by reference herein in its entirety.

SUMMARY

The invention relates to a chain joint for link chains, with a main body in the form of an oval chain link which has two longitudinal limbs that are parallel to each other and connected together at their ends in each case via a curved link portion, wherein one longitudinal limb has an interruption for forming a receiving opening for hooking oval chain links into an internal opening of the main body, which receiving opening is delimited at its ends in each case by a longitudinal limb section, wherein there is provided in this longitudinal limb a threaded bore running in its longitudinal direction which extends into both longitudinal limb sections and into which, to close the receiving opening, a closure screw can be screwed which, in the screwed-in state, engages in the threaded bore in both longitudinal limb sections, wherein the size of the external circumference and the link width of the main body are predefined.

A chain joint of the above-named type has been supplied on the market for some time. The main body of this known chain joint is designed in the form of an oval chain link, one longitudinal limb of which has an interruption for forming a receiving opening via which oval chain links can be hooked into an internal opening of the main body. To close the receiving opening, a threaded bore running in the longitudinal direction of the longitudinal limb is introduced into the two longitudinal limb sections of the main body located on both sides of the receiving opening, which threaded bore is present in each of the two longitudinal limb sections and into which a closure screw can be screwed which is inserted on one of the two longitudinal limb sections into the threaded bore, guided by screwing over the receiving opening and then screwed into the other longitudinal limb section with its end area on the screw-in side into the section of the threaded bore.

In this known chain joint, the main body is designed circumferentially of round steel with a constant cross section and is produced at relatively high cost from round-steel chain links, wherein the chain links serving as blanks for these main bodies of the chain joints are cut out of endless chains and the cut chain links are wasted and increase the raw material usage.

Starting from here, the object of the invention is to improve this known chain joint such that, while retaining its predefined maximum external dimensions (namely external circumference and link width of the main body), it has an improved modulus of bending resistance and an increased tensile strength and, because of its unchanged maximum external dimensions, is still fully capable of running on the same pocket chain wheel as the known chain joint.

According to the invention this is achieved in a chain joint of the type named at the beginning in that, while retaining the predefined sizes for external circumference and link width of the main body, the latter is provided with a larger profile cross section in the area of its longitudinal limbs than the profile cross section in the area of its curved link portions.

As a result of the profile cross section achieved in the invention with an enlarged cross-sectional area on the longitudinal limbs, a greater modulus of bending resistance is thereby already achieved, wherein the enlarged profile cross section also makes it possible to use a connecting screw with a larger diameter than in the case of the known chain joint. The tensile strength of the chain joint is thereby also significantly improved, with unchanged external dimensions, wherein despite the enlarged profile cross section the chain joint can be guided problem-free over the same pocket chain wheels as the known chain joint because of its unchanged maximum external dimensions.

In the chain joint according to the invention the main body is particularly preferably produced as a precision-cast or sintered part or also as a forging. This has the advantage that variable cross sections can be produced with it and the formation of profile cross sections which cannot be produced by bending is also possible.

A further preferred development of the chain joint according to the invention is also that each longitudinal limb has, along its straight extension, a constant profile cross section which, particularly preferably, is provided, on its side facing the internal opening of the main body for receiving the chain links to be hooked in, with a flat delimiting surface running at right angles to the clamp plane of the main body for the internal opening. Such a design of the profile cross section shape on the longitudinal limbs of the main body is particularly favorable for the sake of having as large as possible a cross-sectional area.

It is furthermore advantageous if the profile cross section of the main body in the area of the center of the curved link portions has a profile shape running in a curved manner towards the internal opening of the main body, whereby favorable equipment ratios result when round-steel chain links are hooked in.

A likewise preferred design of the chain joint according to the invention also consists in the threaded bore in the longitudinal limb section on which the closure screw is inserted into the threaded bore being designed continuous from the receiving opening up to the area of the curved link portion, while in the other longitudinal limb section the threaded bore, starting from the receiving opening, is only provided as a blind hole over a predefined longitudinal area. When the closure screw is screwed in, when it has covered the receiving opening, it is thereby ensured that it can then only be screwed in over a length sufficient for it to be securely received in both longitudinal limb sections, but a screwing-in that is too deep is prevented.

In the chain joint according to the invention, the closure screw used can be designed in any suitable manner. However, it is particularly preferably formed as a hexagon socket screw or also as a threaded bolt.

Through the invention a chain joint is created which has a greater modulus of bending resistance compared with the known chain joint which formed the starting point, wherein a closure screw with a larger diameter than in the known chain joint can also be used. In addition, the tensile strength of the chain joint according to the invention is significantly improved, with unchanged maximum external dimensions, wherein it can be used fully capable of running over the same pocket chain wheels as the known chain joint. Finally, in the production of the chain joint according to the invention, the blank for its main body is not formed as a part cut out of an endless chain, with the result that no waste accumulates in the form of chain links cut to release it and the raw material usage is thereby reduced.

BRIEF DESCRIPTION OF THE DRAWINGS

The invention is explained in principle in even more detail below with the help of the drawings by way of example. There are shown in:

FIG. 1 depicts a side view of a chain joint according to the invention;

FIG. 2 depicts a cross-sectional representation of the chain joint from FIG. 1 along the section line II-II in FIG. 1;

FIG. 3 depicts a cross-sectional representation of the chain joint from FIG. 1 along the section line III-III in FIG. 1;

FIG. 4 depicts a perspective diagonal representation of the main body of the chain joint according to the invention from FIG. 1, as well as FIG. 5 depicts a perspective diagonal representation of a closure screw for use in the chain joint according to the invention according to FIG. 1.

DETAILED DESCRIPTION

FIG. 1 shows a side view of a chain joint 1 which has a main body 2 which is designed substantially in the form of an oval chain link which comprises two longitudinal limbs 3, 4 parallel to each other which are connected to each other at their ends in each case via a curved link portion 5, 6, wherein in the embodiment example shown the curved link portions are formed semi-circular in the side view.

In one of the two longitudinal limbs, namely the longitudinal limb 4 represented at the top in FIG. 1, a receiving opening 7 is formed in the center which, when it is not closed, allows oval chain links to be hooked into an internal opening 8 surrounded by the chain joint 1 or its main body 2.

The receiving opening 7 is, as can be seen from FIG. 1 and in particular from FIG. 4, which shows a perspective diagonal representation of the main body 2 of the chain joint 1 from FIG. 1, attached in the center on the longitudinal limb 4 and delimited in its longitudinal direction at both ends in each case by a longitudinal limb section 4A and 4B respectively.

In the longitudinal direction of this longitudinal limb 4 of the main body 2 interrupted by the receiving opening 7, namely in the center in the cross-sectional profile Q1 of this longitudinal limb 4, a threaded bore 9 is provided which is drawn in as a dotted line in FIG. 1.

The threaded bore 9 is attached in such a way that a closure screw 10, as represented in more detail in an embodiment example in FIG. 5 in perspective diagonal view, can be screwed into it from the side of one of the two longitudinal limb sections 4A, 4B, in the embodiment example of FIG. 1 shown from the side of the longitudinal limb section 4B.

The closure screw 10 serves for the purpose of making it possible to close the receiving opening 7 with it if the closure screw 10 is screwed, with its end lying towards the front in the screwing-in direction after bridging the receiving opening 7, into the section of the threaded bore 9 which is formed in the other longitudinal limb section 4A and extends over a length C, wherein it is formed there as a blind hole. In this way, when being screwed into the part of the threaded bore 9 which is present in the longitudinal limb section 4A, the closure screw 10 can only be screwed in over the length C, according to which a deeper screwing-in is no longer possible.

As can be seen from FIG. 5, the closure screw 10 is designed as a threaded bolt that is provided over its entire length with an external thread and which is provided with a hexagon socket on its end facing away from the end on the screw-in side.

If the closure screw 10 is unscrewed from the longitudinal limb 4 (or at least unscrewed until the receiving opening 7 is open and no longer covered by it), chain links can be hooked, with a curved end portion, into the internal opening 8 inside the chain joint 1 via the receiving opening 7. If this happens, the closure screw 10 is then turned again in the screwing-in direction until it completely covers the receiving opening 7 and is screwed into the section of the threaded bore 9 attached in the other longitudinal limb section 4A, preferably over its entire axial extension C.

FIGS. 2 and 3 now show sectional representations through the chain joint 1 from FIG. 1, namely with FIG. 2 corresponding to the section layer II-II and FIG. 3 according to the section layer III-III in FIG. 1:

As can be seen from FIGS. 2 and 3, the main body 2 of the chain joint 1 has, over its whole extension, an equally large link width B.

The profile cross section Q1 of the longitudinal limbs 3, 4, which can be seen in FIG. 2, is formed larger, in fact much larger, than the cross section Q2 which represents the cross section of the profile of the main body 2 in the central area of its curved profile portions 5, 6.

The profile cross section Q1 of the longitudinal limbs 3, 4 has, on its inner side facing the internal opening 8 of the chain joint 1, a flat delimiting surface 11 running at right angles to the clamp plane of the main body 2, while in the area of the curved profile portions 5, 6 the profile cross section Q2 there has a profile shape 12, running in a curved manner towards the internal opening 8 of the main body 2, which is formed semi-circular in cross section in the embodiment example represented.

The profile cross section Q2 formed curved towards the inner side of the chain joint 1 corresponds in terms of its shape to the usual round-steel chain links, which are produced in an oval or curved shape by bending.

In contrast, the cross-sectional shape Q1 of the profile of the longitudinal limbs 3, 4 deviates significantly from this cross-sectional shape of usual round-steel chain links, wherein the much larger cross-sectional area of the profile cross section Q1 on the longitudinal limbs 3, 4 compared with the profile cross section Q2 in the center of the curved link portions 5, 6 allows the use of a closure screw 10 with a larger thread diameter than in the case where the longitudinal limbs 3, 4 of the chain joint 1 are also formed circumferentially with a profile cross section Q2 as shown in FIG. 3.

Through the use of an enlarged profile cross section Q1 in the area of the longitudinal limbs 3, 4, the advantage of a much larger modulus of bending resistance of the chain joint 1 is achieved compared with the case where a circumferentially identical smaller profile cross section Q2 approximately corresponding to that shown in FIG. 3 is used. At the same time, the tensile strength of the chain joint 1 is also increased, without the external circumference A, the length L, the link height H and the link width B of the main body 2 being changed compared with the case where a continuously constant smaller profile cross section Q2 is used.

As a result of the fact that, despite different sizes of the profile cross sections Q1 on the longitudinal limbs 3, 4 and Q2 on the curved link portions 5, 6, the maximum external dimensions of the chain joint 1 (compared with the case of a circumferentially constant profile cross section Q2 in the form of a usual round-steel cross section) are not changed, the chain joint 1 represented in the figures can be guided without difficulties over the same pocket chain wheels as the named other known profile and is in full running order there.

In the chain joint 1 shown, a constant shape and size of the profile cross section Q1 is provided on the two longitudinal limbs 3, 4 inside their, in each case straight, extension area. However, a size of the profile cross section Q1 that changes in these areas could definitely also be used, wherein, however, the use of a constant profile cross section Q1 which can be maximized suitably is naturally advantageous.

The production of the main body 2 of the chain joint 1 represented in the figures can no longer take place in the form of a bent part, because of the differently-sized profile cross sections Q1 and Q2 used. Therefore, the main body 2 is quite particularly preferably produced as a forging or also as a precision-cast or sintered part.

The invention claimed is:

1. Chain joint for link chains, comprising:
a main body in the form of an oval chain link having two longitudinal limbs that are parallel to each other, the longitudinal limbs being connected together at respective adjacent ends thereof via curved link portions, wherein a first limb of the two longitudinal limbs defines a receiving opening for hooking oval chain links into an internal opening defined by the main body, the receiving opening being delimited by two opposed longitudinal limb sections of the first limb;
a threaded bore defined in the first limb, the threaded bore running in a longitudinal direction of the first limb and extending into the two opposed longitudinal limb sections of the first limb;
a closure screw disposed in the threaded bores that, in a screwed-in state, engages in the threaded bore in the two opposed longitudinal limb sections of the first limb,
wherein an external circumference and a link width of the main body are of a predefined size, such that, while retaining the predefined size for the external circumference and link width of the main body, the link width is provided with a larger profile cross section in an area of the longitudinal limbs than a profile cross section in an area of the curved link portions,
wherein the threaded bore defined on a first of the two opposed longitudinal limb sections on which the closure screw is inserted into the threaded bore is provided continuous from the receiving opening up to the area of the curved link portion, while the threaded bore in a second of the two opposed longitudinal limb sections, starting from the receiving opening, defines a blind hole over a predefined longitudinal area.

2. Chain joint according to claim 1, the main body is produced by precision casting or by sintering.

3. Chain joint according to claim 1, the main body is formed as a forging.

4. Chain joint according to claim 1, wherein each of the two longitudinal limbs is provided with a constant profile cross section along a straight extension.

5. Chain joint according to claim 4, wherein the profile cross section of each longitudinal limb on a side facing the internal opening of the main body for receiving the chain links forms a flat delimiting surface running at right angles to a clamp plane of the main body for the internal opening.

6. Chain joint according to claim 4, wherein the profile cross section of the main body in an area of the center of the curved link portions has a profile shape running in a curved manner towards the internal opening of the main body.

7. Chain joint according to claim 1, wherein the closure screw is a socket screw.

8. Chain joint according to claim 1, wherein the closure screw is a threaded bolt.

* * * * *